United States Patent
Wang

(10) Patent No.: US 9,600,369 B2
(45) Date of Patent: Mar. 21, 2017

(54) OPERATING SYSTEM RECOVERY METHOD AND APPARATUS, AND TERMINAL DEVICE

(71) Applicant: Huawei Technologies Co., Ltd., Shenzhen (CN)

(72) Inventor: Dedong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 14/583,938

(22) Filed: Dec. 29, 2014

(65) Prior Publication Data
US 2015/0160950 A1 Jun. 11, 2015

Related U.S. Application Data

(63) Continuation of application No. PCT/CN2014/081159, filed on Jun. 30, 2014.

(30) Foreign Application Priority Data

Dec. 10, 2013 (CN) .......................... 2013 1 0674990

(51) Int. Cl.
G06F 1/26 (2006.01)
G06F 9/24 (2006.01)
(Continued)

(52) U.S. Cl.
CPC ................. *G06F 11/1417* (2013.01)

(58) Field of Classification Search
CPC ..... G06F 9/4401; G06F 9/4406; G06F 9/4418
(Continued)

(56) References Cited

U.S. PATENT DOCUMENTS 7,624,260 B2 * 11/2009 Ethier .................. G06F 9/4403
713/1
2002/0152370 A1 10/2002 Wada
(Continued)

FOREIGN PATENT DOCUMENTS

CN 1818869 A 8/2006
CN 1825283 A 8/2006
(Continued)

OTHER PUBLICATIONS

Asberg, M., et al., "Fast Linux Bootup using Non-Intrusive Methods for Predictable Industrial Embedded Systems," 18th Conference on Emerging Technologies & Factory Automation (ETFA), Sep. 10, 2013, 8 pages.
(Continued)

*Primary Examiner* — Mark Connolly
(74) *Attorney, Agent, or Firm* — Quarles & Brady LLP

(57) ABSTRACT

An operating system recovery method is provided. The method includes starting a level 2 kernel, and transferring an image file of a to-be-recovered operating system to a specified location of a memory by using the started level 2 kernel so that a location of a recovery program in the level 2 kernel in the memory is the same as a location of a recovery program in an original kernel in the memory, where the level 2 kernel is obtained by tailoring an image file of the original kernel and then compiling a tailored image file of the original kernel; and recovering, by using the level 2 kernel, the operating system to a state, before the operating system enters a hibernation mode, of the operating system. A recovery speed of the operating system can be accelerated. In addition, a corresponding apparatus and terminal device are further provided.

18 Claims, 7 Drawing Sheets

(51) Int. Cl.
*G06F 15/177* (2006.01)
*G06F 11/14* (2006.01)

(58) Field of Classification Search
USPC .................................. 713/1, 2, 300, 320
See application file for complete search history.

(56) References Cited

U.S. PATENT DOCUMENTS

| | | | |
|---|---|---|---|
| 2007/0067679 | A1 | 3/2007 | Deobald |
| 2007/0277051 | A1 | 11/2007 | Reece et al. |
| 2008/0005541 | A1 | 1/2008 | Hase et al. |
| 2010/0064159 | A1 | 3/2010 | Wu et al. |
| 2012/0221843 | A1 | 8/2012 | Bak et al. |
| 2012/0311240 | A1 | 12/2012 | Kato |
| 2013/0111202 | A1 | 5/2013 | Zeng et al. |
| 2014/0078091 | A1 | 3/2014 | Lu et al. |
| 2014/0281463 | A1* | 9/2014 | Even ................ G06F 9/4406 713/2 |

FOREIGN PATENT DOCUMENTS

| | | | |
|---|---|---|---|
| CN | 1946210 | A | 4/2007 |
| CN | 101163303 | A | 4/2008 |
| CN | 101222709 | A | 7/2008 |
| CN | 101232401 | A | 7/2008 |
| CN | 101252740 | A | 8/2008 |
| CN | 101268443 | A | 9/2008 |
| CN | 101424732 | A | 5/2009 |
| CN | 101582029 | A | 11/2009 |
| CN | 101625647 | A | 1/2010 |
| CN | 101794232 | A | 8/2010 |
| CN | 101854433 | A | 10/2010 |
| CN | 101916201 | A | 12/2010 |
| CN | 102065182 | A | 5/2011 |
| CN | 102081504 | A | 6/2011 |
| CN | 102131120 | A | 7/2011 |
| CN | 201910892 | U | 7/2011 |
| CN | 102193813 | A | 9/2011 |
| CN | 102207881 | A | 10/2011 |
| CN | 102404634 | A | 4/2012 |
| CN | 102565823 | A | 7/2012 |
| CN | 102609274 | A | 7/2012 |
| CN | 102622256 | A | 8/2012 |
| CN | 102708064 | A | 10/2012 |
| CN | 102880414 | A | 1/2013 |
| CN | 202696822 | U | 1/2013 |
| CN | 103729211 | A | 4/2014 |
| GB | 2474957 | A | 5/2011 |
| JP | 2007334383 | A | 12/2007 |
| JP | 20120252576 | A | 12/2012 |
| KR | 20080059583 | A | 6/2008 |
| TW | 200719134 | A | 5/2007 |
| TW | 2010011525 | A | 3/2010 |
| TW | 201248401 | A | 12/2012 |
| WO | 2007037846 | A1 | 4/2007 |
| WO | 2012161777 | A2 | 11/2012 |

OTHER PUBLICATIONS

Foreign Communication From a Counterpart Application, European Application No. 14808804.0, Extended European Search Report dated Nov. 25, 2015, 10 pages.
Foreign Communication From a Counterpart Application, Taiwanese Application No. 10421578110, Taiwanese Office Action dated Nov. 25, 2015, 7 pages.
Partial English Translation and Abstract of Chinese Patent Application No. CN1946210A, Apr. 6, 2015, 4 pages.
Partial English Translation and Abstract of Chinese Patent Application No. CN101163303A, Apr. 6, 2015, 4 pages.
Partial English Translation and Abstract of Chinese Patent Application No. CN101222709A, Apr. 6, 2015, 4 pages.
Partial English Translation and Abstract of Chinese Patent Application No. CN101232401A, Apr. 6, 2015, 4 pages.
Partial English Translation and Abstract of Chinese Patent Application No. CN101252740A, Apr. 6, 2015, 4 pages.
Partial English Translation and Abstract of Chinese Patent Application No. CN101424732A, Apr. 6, 2015, 6 pages.
Partial English Translation and Abstract of Chinese Patent Application No. CN101854433A, Apr. 6, 2015, 5 pages.
Partial English Translation and Abstract of Chinese Patent Application No. CN102065182A, Apr. 6, 2015, 3 pages.
Partial English Translation and Abstract of Chinese Patent Application No. CN102081504A, Apr. 6, 2015, 4 pages.
Partial English Translation and Abstract of Chinese Patent Application No. CN102131120A, Apr. 6, 2015, 3 pages.
Partial English Translation and Abstract of Chinese Patent Application No. CN102193813A, Apr. 6, 2015, 3 pages.
Partial English Translation and Abstract of Chinese Patent Application No. CN102404634A, Apr. 6, 2015, 5 pages.
Partial English Translation and Abstract of Chinese Patent Application No. CN102565823A, Apr. 6, 2015, 3 pages.
Partial English Translation and Abstract of Chinese Patent Application No. CN102609274A, Apr. 6, 2015, 4 pages.
Partial English Translation and Abstract of Chinese Patent Application No. CN102622256A, Apr. 6, 2015, 2 pages.
Partial English Translation and Abstract of Chinese Patent Application No. CN201910892U, Mar. 24, 2015, 9 pages.
Partial English Translation and Abstract of Chinese Patent Application No. CN202696822U, Apr. 6, 2015, 3 pages.
Partial English Translation and Abstract of Chinese Patent Application No. CN1818869A, Jan. 9, 2015, 4 pages.
Partial English Translation and Abstract of Chinese Patent Application No. CN1825283A, Jan. 9, 2015, 4 pages.
Partial English Translation and Abstract of Chinese Patent Application No. CN101625647A, Jan. 9, 2015, 3 pages.
Partial English Translation and Abstract of Chinese Patent Application No. CN102207881A, Jan. 9, 2015, 5 pages.
Partial English Translation and Abstract of Chinese Patent Application No. CN103729211A, Part 1, Jan. 9, 2015, 9 pages.
Partial English Translation and Abstract of Chinese Patent Application No. CN103729211A, Part 2, Jan. 9, 2015, 3 pages.
Foreign Communication From a Counterpart Application, PCT Application No. PCT/CN2014/081159, International Search Report dated Sep. 30, 2014, 7 pages.
Foreign Communication From a Counterpart Application, Korean Application No. 10-2015-7000032, Korean Office Action dated Feb. 19, 2016, 5 pages.
Foreign Communication From a Counterpart Application, Korean Application No. 10-2015-7000032, English Translation of Korean Office Action dated Feb. 19, 2016, 4 pages.
Foreign Communication From a Counterpart Application, Chinese Application No. 201310674990.2, Chinese Search Report dated Apr. 17, 2016, 2 pages.
Notice of Allowance, issued in corresponding Japanese Application No. 2015-551982 (including an English translation), dated May 10, 2016, 6 pages.
Office Action, issued in corresponding Chinese Application No. 20130674990.2 (including an English translation), dated Apr. 28, 2016, 20 pages.
Written Opinion of the International Searching Authority, issued in corresponding PCT Application No. PCT/CN2014/081159 (including an English translation), dated Sep. 30, 2014, 14 pages.

* cited by examiner

OPERATING SYSTEM RECOVERY METHOD AND APPARATUS, AND TERMINAL DEVICE

CROSS-REFERENCE TO RELATED APPLICATIONS

This application is a continuation of International Application No. PCT/CN2014/081159, filed on Jun. 30, 2014, which claims priority to Chinese Patent Application No. 201310674990.2, filed on Dec. 10, 2013, both of which are hereby incorporated by reference in their entireties.

TECHNICAL FIELD

The present invention relates to the field of operating system technologies, and in particular, to an operating system recovery method and apparatus, and a terminal device.

BACKGROUND

Hibernation is a computer power management technology. In the prior art, when a computer enters a hibernation mode, hibernation state information of an operating system of the computer is saved in a non-volatile memory of a system in a form of an image file, where the image file is an image file of the operating system, and the image file of the operating system includes an original kernel and other application program information. When the computer is awakened from the hibernation mode and once it detects that an image file of a to-be-recovered operating system is saved in the non-volatile memory, the computer first loads and starts the original kernel, reads the image file of the operating system from the non-volatile memory of the system by using the started original kernel, and recovers, according to the hibernation state information of the operating system included in the image file of the operating system, the operating system of the computer to a state, before the operating system enters the hibernation mode, of the operating system. In the prior art, because the original kernel is consistent with a kernel included in the operating system, a recovery speed of a method for recovering the operating system of the computer in the prior art is relatively slow.

SUMMARY

Embodiments of the present invention provide an operating system recovery method and apparatus, and a terminal device to accelerate a recovery speed of an operating system.

According to a first aspect, an embodiment of the present invention provides an operating system recovery method, and the method includes starting a level 2 kernel, and transferring an image file of a to-be-recovered operating system to a specified location of a memory by using the started level 2 kernel so that a location of a recovery program in the level 2 kernel in the memory is the same as a location of a recovery program in an original kernel in the memory, where the level 2 kernel is obtained by tailoring an image file of the original kernel and then compiling a tailored image file of the original kernel, and the image file of the operating system includes hibernation state information of the operating system; and using, through the recovery program in the started level 2 kernel, the hibernation state information of the operating system included in the image file of the operating system in the specified location of the memory to recover the operating system to a state, before the operating system enters a hibernation mode, of the operating system.

With reference to the first aspect, in a first implementation manner, the transferring an image file of a to-be-recovered operating system to a specified location of a memory by using the started level 2 kernel so that a location of a recovery program in the level 2 kernel in the memory is the same as a location of a recovery program in an original kernel in the memory includes transferring the image file of the to-be-recovered operating system from a non-volatile memory to the specified location of the memory by using the started level 2 kernel so that the location of the recovery program in the level 2 kernel in the memory is the same as the location of the recovery program in the original kernel in the memory.

With reference to the first aspect, in a second implementation manner, the transferring an image file of a to-be-recovered operating system to a specified location of a memory by using the started level 2 kernel so that a location of a recovery program in the level 2 kernel in the memory is the same as a location of a recovery program in an original kernel in the memory includes reading the image file of the operating system on the non-volatile memory into a dedicated device partition of the memory; and transferring the image file of the to-be-recovered operating system from the dedicated device partition of the memory to the specified location of the memory by using the started level 2 kernel so that the location of the recovery program in the level 2 kernel in the memory is the same as the location of the recovery program in the original kernel in the memory.

With reference to the first aspect, the first implementation manner of the first aspect, or the second implementation manner of the first aspect, in a third implementation manner, after the starting a level 2 kernel and before the transferring an image file of a to-be-recovered operating system to a specified location of a memory by using the started level 2 kernel, the method further includes loading an image file of the level 2 kernel.

With reference to the first aspect or any implementation manner of the first implementation manner of the first aspect to the third implementation manner of the first aspect, in a fourth implementation manner, after the using, through the recovery program in the started level 2 kernel, the hibernation state information of the operating system included in the image file of the operating system in the specified location of the memory to recover the operating system to a state, before the operating system enters a hibernation mode, of the operating system, the method further includes replacing the level 2 kernel with the original kernel included in a recovered operating system.

With reference to the fourth implementation manner of the first aspect, in a fifth implementation manner, the method further includes resuming, by using the original kernel included in the recovered operating system, an external device suspended when the operating system enters the hibernation mode.

With reference to the first aspect or any implementation manner of the first implementation manner of the first aspect to the fifth implementation manner of the first aspect, in a sixth implementation manner, the hibernation state information of the operating system includes hibernation state information, which is frozen and saved before the operating system enters the hibernation mode, of the operating system; or hibernation state information, which is set and saved in advance, of the operating system.

According to a second aspect, an embodiment of the present invention provides an operating system recovery apparatus, and the apparatus includes a boot loader unit configured to start a level 2 kernel, where the level 2 kernel is obtained by tailoring an image file of the original kernel and then compiling a tailored image file of the original kernel; a reading unit configured to transfer an image file of a to-be-recovered operating system to a specified location of a memory by using the started level 2 kernel so that a location of a recovery program in the level 2 kernel in the memory is the same as a location of a recovery program in the original kernel in the memory, where the image file of the operating system includes hibernation state information of the operating system; and a recovery unit configured to use, through the recovery program in the started level 2 kernel, the hibernation state information of the operating system included in the image file of the operating system in the specified location of the memory to recover the operating system to a state, before the operating system enters a hibernation mode, of the operating system.

With reference to the second aspect, in a first implementation manner, the reading unit is configured to transfer the image file of the to-be-recovered operating system from a non-volatile memory to the specified location of the memory by using the started level 2 kernel so that the location of the recovery program in the level 2 kernel in the memory is the same as the location of the recovery program in the original kernel in the memory, and the image file of the operating system includes the hibernation state information of the operating system.

With reference to the second aspect, in a second implementation manner, the boot loader unit is further configured to read the image file of the operating system on external storage into a dedicated device partition of the memory; and the reading unit is configured to transfer the image file of the to-be-recovered operating system from the dedicated device partition of the memory to the specified location of the memory by using the started level 2 kernel so that the location of the recovery program in the level 2 kernel in the memory is the same as the location of the recovery program in the original kernel in the memory, where the image file of the operating system includes the hibernation state information of the operating system.

With reference to the second aspect, the first implementation manner of the second aspect, or the second implementation manner of the second aspect, in a third implementation manner, the boot loader unit is further configured to load an image file of the level 2 kernel.

With reference to the second aspect or any implementation manner of the first implementation manner of the second aspect to the third implementation manner of the second aspect, in a fourth implementation manner, the recovery unit is further configured to replace the level 2 kernel with the original kernel included in a recovered operating system.

With reference to the fourth implementation manner of the second aspect, in a fifth implementation manner, the recovery unit is further configured to resume, by using the original kernel included in the recovered operating system, an external device suspended when the operating system enters the hibernation mode.

According to a third aspect, an embodiment of the present invention further provides a terminal device, and the device includes a memory, and the operating system recovery apparatus according to the second aspect or any implementation manner of the first implementation manner of the second aspect to the fifth implementation manner of the second aspect, where the memory stores an image file of an operating system that runs on the terminal device, and the operating system recovery apparatus is configured to recover, by using a hibernation state information included in the image file of the operating system in a specified location of the memory, the operating system to a state, before the operating system enters a hibernation mode, of the operating system.

It may be learned that, in the operating system recovery method and apparatus, and the terminal device provided by the embodiments of the present invention and in the technical solutions provided by the embodiments of the present invention, after a level 2 kernel is started, an image file of a to-be-recovered operating system is transferred to a specified location of a memory by using the started level 2 kernel so that a location of a recovery program in the level 2 kernel in the memory is the same as a location of a recovery program in an original kernel in the memory, which aims to ensure that the operating system can be smoothly recovered to a state, before the operating system enters a hibernation mode, of the operating system. In these solutions, the level 2 kernel is obtained by tailoring an image file of the original kernel and then compiling a tailored image file of the original kernel; then, it may be implemented that a time required for starting the level 2 kernel is less than a time required for starting the original kernel. Therefore, according to the technical solutions provided by the embodiments of the present invention, on a basis of implementing normal recovery of an operating system, a recovery speed of the operating system is accelerated because the time for starting the level 2 kernel becomes shorter.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Embodiment 1

Figure 3A:
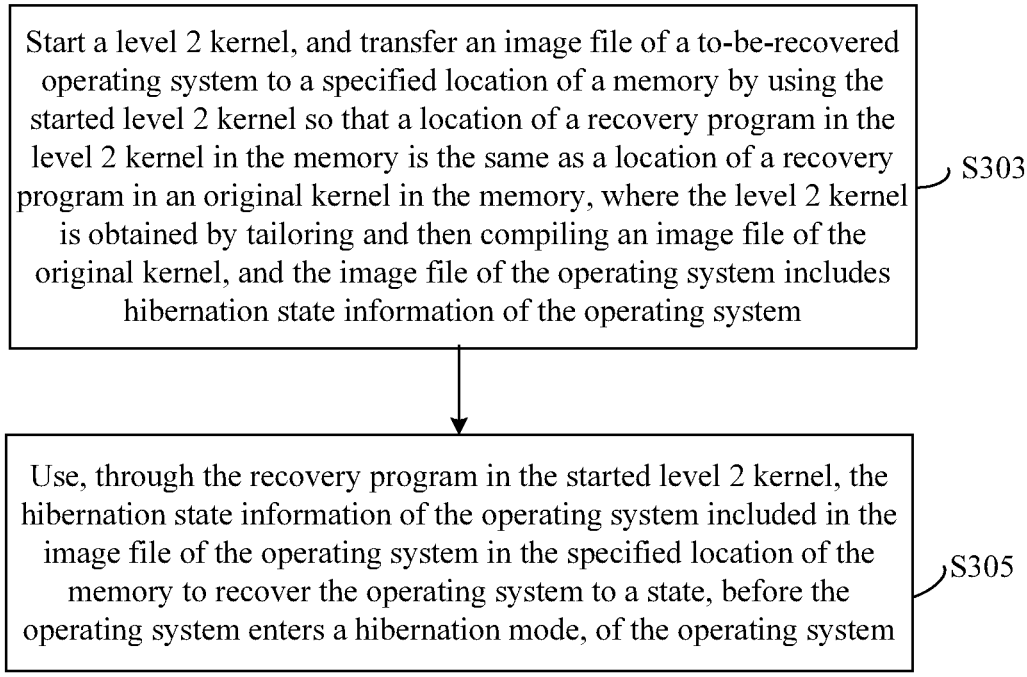
FIG. 3A is a method flowchart of an operating system recovery method according to an embodiment of the present invention.

FIG. 3A is a method flowchart of an operating system recovery method according to an embodiment of the present invention. The operating system recovery method provided by this embodiment of the present invention may be applied to a computer system, where the computer system may be located on a physical host, and may also be located on multiple physical hosts. The computer system may be located on a terminal device, such as one or more computers, portable computers, handheld devices (for example a mobile phone and a PAD), or servers. For a logical structure of the terminal device, reference may be made to FIG. 1.

Figure 1:
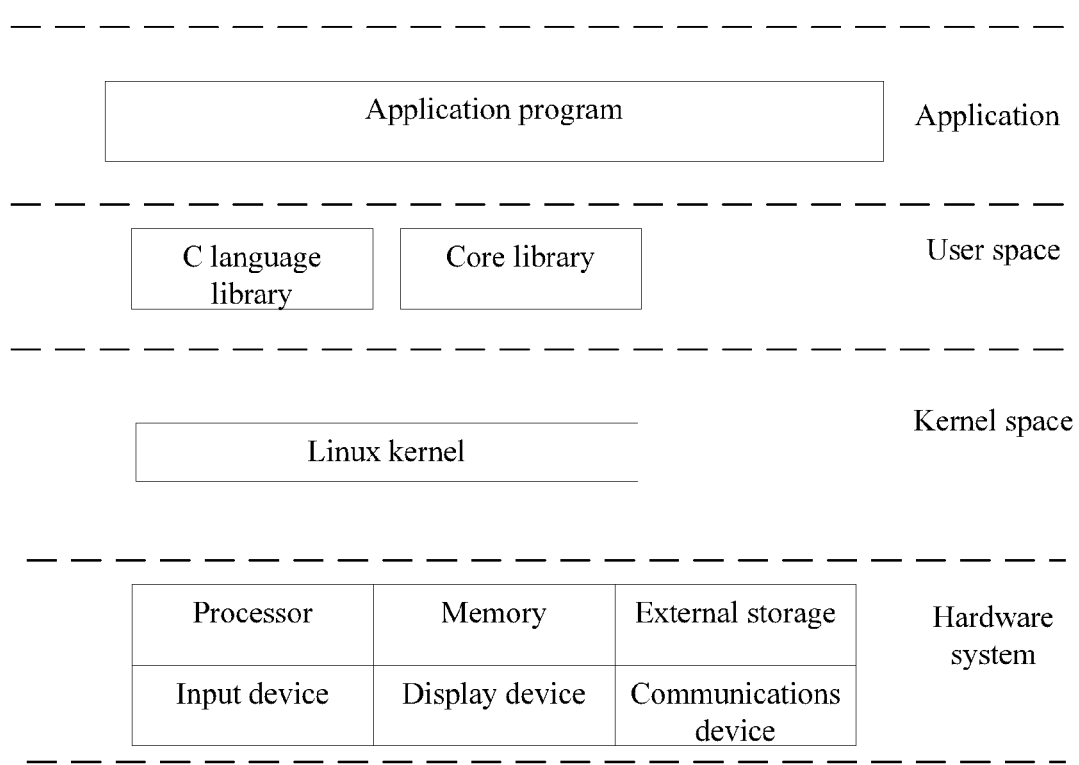
FIG. 1 is a diagram of a logical structure of a terminal device in the prior art.

Referring to FIG. 1, FIG. 1 is a diagram of a logical structure of a terminal device according to an embodiment of the present invention. An operating system that includes a standard Linux kernel may be installed and run on the terminal device. The terminal device may be a personal computer, a smartphone, a set top box, a global positioning system (GPS), and the like. As shown in FIG. 1, a hardware system of the terminal device includes a processor, an input device, a display device, a communications device, a memory, a non-volatile memory (the non-volatile memory includes but is not limited to a hard disk and an optical disc), and the like, and certainly, the hardware system of the terminal device may further include an output device, a memory controller, a network interface, and the like. The input device may include a keyboard, a mouse, a touch screen, or the like; kernel space run on the hardware system, and the Linux kernel of the operating system and some drive programs run on the kernel space; user space run on the kernel space, and the user space includes a C language library, a core library, and the like; and various application programs, such as a launcher, a media player, and a browser (not shown in the diagram), run on the user space.

Referring to FIG. 3A, a specific procedure of the operating system recovery method provided by this embodiment of the present invention is as follows.

S303: Start a level 2 kernel, and transfer an image file of a to-be-recovered operating system to a specified location of a memory by using the started level 2 kernel so that a location of a recovery program in the level 2 kernel in the memory is the same as a location of a recovery program in an original kernel in the memory, where the level 2 kernel is obtained by tailoring an image file of the original kernel and then compiling a tailored image file of the original kernel, and the image file of the operating system includes hibernation state information of the operating system.

First, a kernel is a core of an operating system and a first layer of software extension based on hardware, is used to provide a most basic function of the operating system, and is a basis for working of the operating system. The level 2 kernel is obtained by tailoring an image file of the original kernel and then compiling a tailored image file of the original kernel, and the original kernel refers to a kernel included in the operating system before the operating system enters a hibernation mode, and a time required for starting the level 2 kernel is less than a time required for starting the original kernel. The image file of the original kernel includes multiple code segments, and an image file of the level 2 kernel is obtained by cutting a code segment that is included in the image file of the original kernel and irrelevant to recovery of the operating system. The level 2 kernel may include only a code segment that is indispensable to the recovery of the operating system, and may further include a code segment that is irrelevant to the recovery of the operating system. In conclusion, that an invention objective of accelerating a recovery speed of the operating system in the present invention may be implemented as long as it is ensured that the number of code segments included in the image file of the level 2 kernel is relatively less than the number of code segments included in the image file of the original kernel shall fall within the protection scope of the present invention.

It should be noted that the level 2 kernel is started after a boot loader program loads the image file of the level 2 kernel. The image file of the level 2 kernel may be generated and saved in a non-volatile memory of the system when the system hibernates or is shut down, and may also be saved in the non-volatile memory of the system in advance. When the system needs to be awakened from the hibernation mode, the level 2 kernel is loaded and run, so as to implement the invention objective of the present invention. In conclusion, a manner of generating the image file of the level 2 kernel is not restrictively stipulated in this embodiment of the present invention.

The image file of the original kernel includes code segments that separately correspond to different functions of the original kernel, such as a memory management code segment for managing a memory and a file management code segment for managing a file. Correspondingly, the image file of the level 2 kernel also includes code segments, a difference of the image file of the level 2 kernel from the image file of the original kernel lies in that the number of code segments included in the image file of the level 2 kernel are relatively less than the number of code segments included in the image file of the original kernel. Therefore, a time required for loading the image file of the level 2 kernel is less than a time required, in the prior art, for loading the image file of the original kernel.

Figure 2A:
FIG. 2A is a schematic structural diagram of an image file of an original kernel.
Figure 2B:
FIG. 2B is a schematic structural diagram of an image file of a level 2 kernel.

FIG. 2A and FIG. 2B are used as examples for description. The image file of the original kernel shown in FIG. 2A includes six code segments: a recovery program, a process management, memory management, file management, a protocol stack, and device management. The image file of the level 2 kernel shown in FIG. 2B includes three code segments: a recovery program (e.g., a recovery code), memory management, and process management. The image file of the level 2 kernel is obtained by cutting three code segments: the file management, the protocol stack, and the device management, and then recompiling the image file of the original kernel. Certainly, code segments included in an image file of a commonly used Linux kernel are not limited only to the foregoing six code segments. It is well known that the Linux kernel may include drivers of various hardware devices in the terminal device, such as a display driver, a camera driver, a BLUETOOTH driver, a flash memory driver, a keyboard driver, a universal serial bus (USB) driver, a render driver, a power management driver, a Wireless-Fidelity (Wi-Fi) driver, and an audio driver. Correspondingly, the image file of the Linux kernel also includes each of the foregoing code segments.

It should be noted that the level 2 kernel transfers the image file of the to-be-recovered operating system to the specified location of the memory so that the location of the recovery program in the level 2 kernel in the memory is the same as the location of the recovery program in the original kernel in the memory, where the original kernel refers to a kernel included in the operating system before the operating system enters the hibernation mode. The level 2 kernel is used to recover the operating system to a state, before the operating system enters the hibernation mode, of the operating system. Actually, the recovery program in the level 2 kernel is used to implement the foregoing recovery function. That the location of the recovery program in the level 2 kernel in the memory is the same as the location of the recovery program in the original kernel in the memory is to ensure that the recovery program in the level 2 kernel is smoothly overwritten and replaced by the recovery program in the original kernel included in a recovered operating system, that is, to implement a secure takeover from the recovery program in the level 2 kernel to the recovery program in the original kernel and avoid that other code segments of the original kernel overwrite the recovery program in the level 2 kernel and the system crashes and cannot be recovered.

It is worth noting that the image file of the to-be-recovered operating system is transferred to the specified location of the memory by using the started level 2 kernel. Reference is made to step S313 shown in FIG. 3B: transfer the image file of the to-be-recovered operating system from a non-volatile memory to the specified location of the memory by using the started level 2 kernel so that the location of the recovery program in the level 2 kernel in the memory is the same as the location of the recovery program in the original kernel in the memory.

The level 2 kernel may directly transfer the image file of the to-be-recovered operating system from the non-volatile memory to the specified location of the memory. Certainly, a prerequisite for implementing this solution is that the level 2 kernel has a function of reading a file on the non-volatile memory into the memory.

Figure 3B:
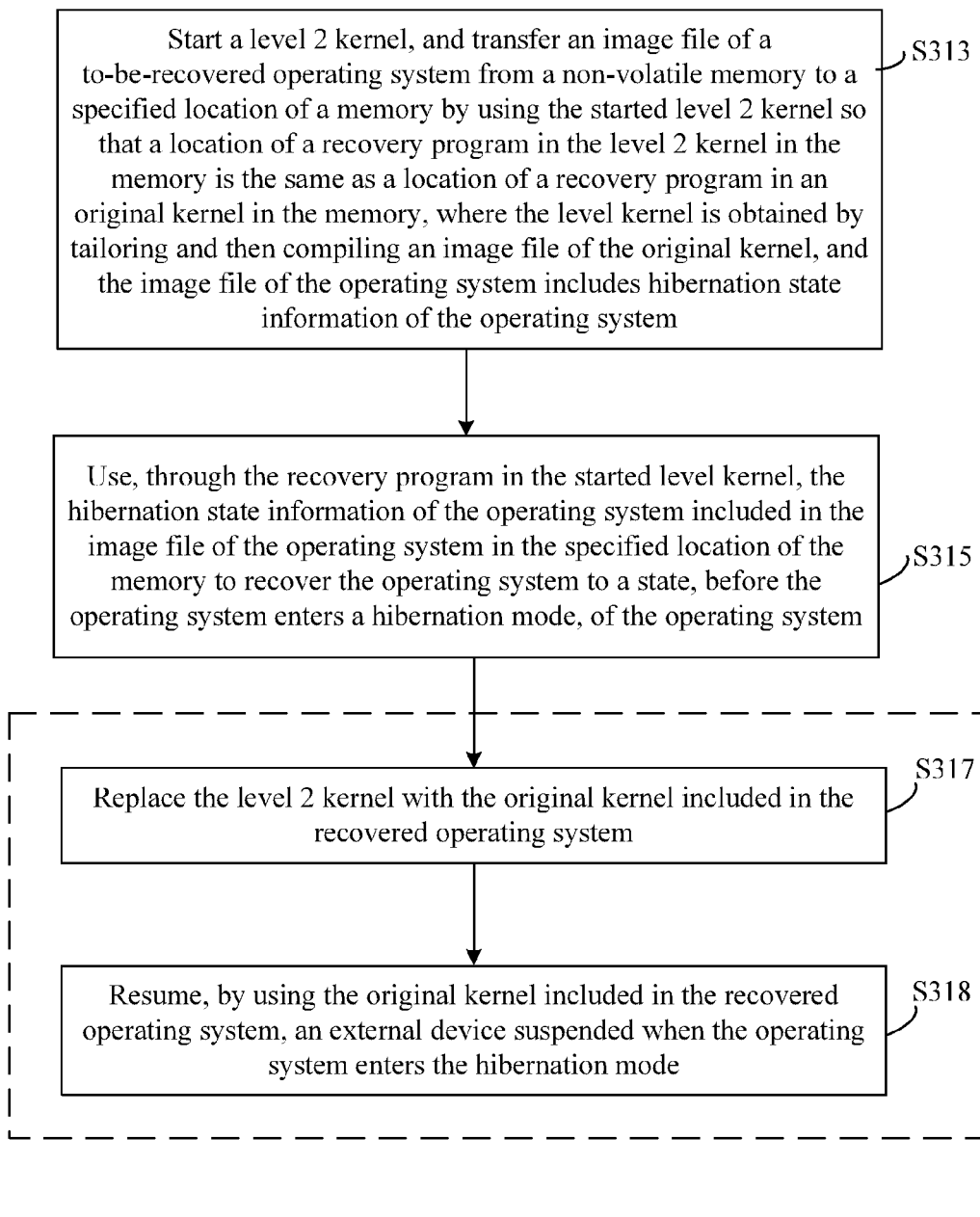
FIG. 3B is a method flowchart of another operating system recovery method according to an embodiment of the present invention.
Figure 3C:
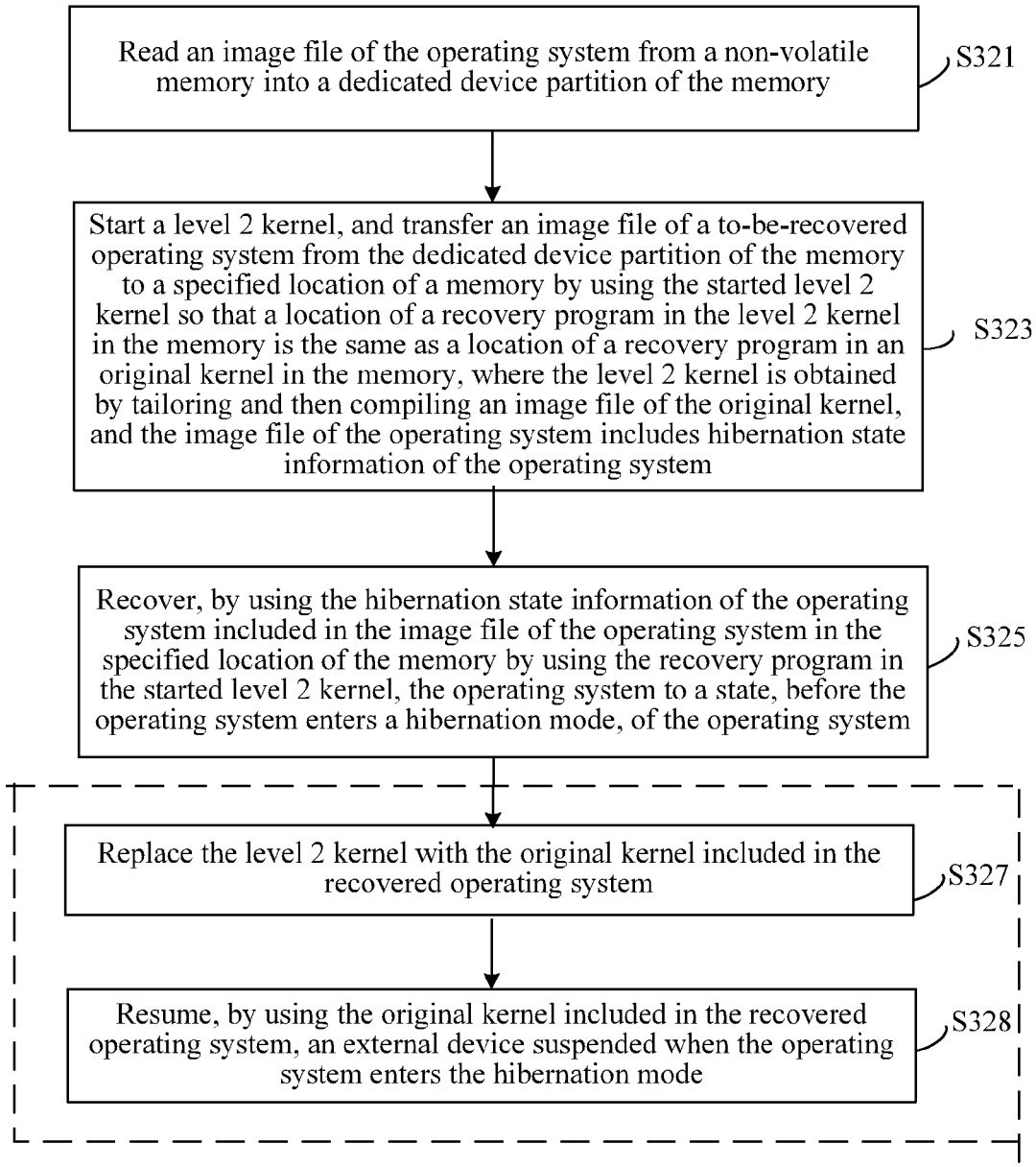
FIG. 3C is a method flowchart of still another operating system recovery method according to an embodiment of the present invention.

As another embodiment of the present invention, reference is made to step S323 shown in FIG. 3C: transfer the image file of the to-be-recovered operating system from a dedicated device partition of the memory to the specified location of the memory by using the started level 2 kernel so that the location of the recovery program in the level 2 kernel in the memory is the same as the location of the recovery program in the original kernel in the memory.

In this embodiment, the level 2 kernel reads the image file of the to-be-recovered operating system from the dedicated device partition of the memory. It should be noted that when this solution is adopted, the level 2 kernel may also have the function of reading a file on the non-volatile memory into the memory; and certainly, the level 2 kernel may not have the function of reading a file on the non-volatile memory into the memory. When the level 2 kernel does not have the function of reading a file on the non-volatile memory into the memory, the boot loader program first needs to read the image file of the operating system on the non-volatile memory into the dedicated device partition of the memory, and then the level 2 kernel transfers the image file of the operating system from the dedicated device partition of the memory to the specified location of the memory.

It should be noted that when the level 2 kernel transfers the image file of the to-be-recovered operating system from the dedicated device partition of the memory to the specified location of the memory, the operating system recovery method in this embodiment of the present invention further needs to include step S321: read the image file of the operating system on the non-volatile memory into the dedicated device partition of the memory.

It is worth noting that the dedicated device partition of the memory refers to a partition, which is allocated to a device for dedicated use and is not managed by the kernel, in a physical memory. Addresses of the dedicated device partition in the physical memory are consecutive, and the dedicated device partition may be a persistent memory (PMEM) partition, or the like.

In an embedded operating system, the boot loader program runs before the kernel of the operating system runs, and the boot loader program may initialize a hardware environment and create a mapping picture of memory space, thereby bringing software and hardware environments of the system into a suitable status so as to prepare an environment for invoking the kernel of the operating system in the end. For this embodiment of the present invention, after power is on, the boot loader program first runs, and then, the image file of the operating system located on the non-volatile memory is read into the dedicated device partition of the memory. This is because, the boot loader program has a capability of reading the image file of the operating system from the non-volatile memory, and the function of the boot loader program is used so that a file management function, in the prior art, of the file management code segment included in the kernel may not be relied on. A function of using the boot loader program to read the image file of the operating system on the non-volatile into the memory lies in that, when the image file of the level 2 kernel is obtained by tailoring an image file of the original kernel and then compiling a tailored image file of the original kernel, the file management code segment included in the image file of the original kernel may be cut so that the level 2 kernel becomes smaller and a loading speed is higher on a prerequisite of ensuring that the level 2 kernel smoothly recovers the operating system to the state, before the operating system enters the hibernation mode, of the operating system.

The hibernation state information of the operating system refers to hibernation state information, which is frozen and saved before the operating system enters the hibernation mode, of the operating system. The hibernation state information of the operating system includes information about all processes running on the operating system, device data for representing an operating status of an external device, and original kernel data for representing an operating status of the original kernel, and the like. After the hibernation mode of a running operating system is activated, the operating system takes a snapshot of all information included in the memory and a central processing unit (CPU) register, and then the snapshot, that is, the hibernation state information of the operating system is saved in the image file. It should be noted that the hibernation state information of the operating system may also be hibernation state information, which is set and saved in advance, of the operating system. For example, in a vehicle-mounted GPS, the hibernation state information of the operating system may be set in advance. In this way, each time the GPS starts, the GPS may be directly recovered to a fixed status to meet an actual requirement.

S305. Use, through the recovery program in the started level 2 kernel, the hibernation state information of the operating system included in the image file of the operating system in the specified location of the memory to recover the operating system to a state, before the operating system enters a hibernation mode, of the operating system.

The recovering the operating system to a state, before the operating system enters a hibernation mode, of the operating system refers to that, by recovering the information about all processes running on the operating system, the device data for representing the operating status of the external device, and the original kernel data for representing the operating status of the original kernel that are before the operating system enters the hibernation mode, the operating system is completely recovered to the state, before the operating system enters the hibernation mode, of the operating system.

Further, referring to a schematic flowchart of an operating system recovery method shown in FIG. 3B, before the transferring the image file of the to-be-recovered operating system from a non-volatile memory to the specified location of the memory by using the started level 2 kernel in step S313, the method further includes loading the image file of the level 2 kernel.

The reading of the image file of the operating system on the non-volatile memory into the dedicated device partition of the memory is performed by a boot loader program that runs after the computer is powered on. The boot loader program is a first segment of software code that runs after the system is powered on. The boot loader program in the computer includes a basic input/output system (BIOS) and a Bootloader located in a master boot record (MBR) of a hard disk. After hardware detection and resource allocation are completed, the BIOS reads the Bootloader in the MBR of the hard disk into the system of the memory, and then hands over a control permission to the Bootloader. A main running task of the Bootloader is to read the image fie of the kernel on the hard disk into the memory, and then the Bootloader jumps to an entry point of the kernel for running.

It should be noted that correspondingly, an operating system recovery method shown in FIG. 3C also includes a step: load the image file of the level 2 kernel.

S315: Use, through the recovery program in the started level kernel, the hibernation state information of the operating system included in the image file of the operating system in the specified location of the memory to recover the operating system to a state, before the operating system enters a hibernation mode, of the operating system.

It is worth noting that, referring to FIG. 3B, the operating system recovery method may further include the following step S317: after the using, through the recovery program in the started level 2 kernel, the hibernation state information of the operating system included in the image file of the operating system in the specified location of the memory to recover the operating system to a state, before the operating system enters a hibernation mode, of the operating system, replace the level 2 kernel with the original kernel included in the recovered operating system.

The recovery program in the level 2 kernel recovers, by using the hibernation state information included in the image file of the operating system, the operating system to the state, before the operating system enters the hibernation mode, of the operating system. When the operating system is recovered, the original kernel included in the operating system is recovered simultaneously. Based on that the location of the recovery program included in the original kernel in the memory is the same as the location of the recovery program included in the level 2 kernel in the memory, the original kernel may overwrite and replace the level 2 kernel so that the operating system is successfully recovered.

Further, referring to FIG. 3B, and a flowchart of the operating system recovery method may further include the following step S318: resume, by using the original kernel included in the recovered operating system, an external device suspended when the operating system enters the hibernation mode.

When the operating system is recovered to the state, before the operating system enters the hibernation mode, of the operating system, the original kernel included in the operating system resumes the external device suspended when the operating system enters the hibernation mode so that the terminal device on which the operating system runs is completely recovered to the state, before the operating system enters the hibernation mode, of the operating system, where the external device may be a system hard disk, or the like. After the operating system is recovered, the operating system recovers, according to the device data included in the hibernation state information, the device to the state, before the device enters the hibernation mode, of the operating system.

S325: Recover, by using the hibernation state information of the operating system included in the image file of the operating system in the specified location of the memory by using the recovery program in the started level 2 kernel, the operating system to a state, before the operating system enters a hibernation mode, of the operating system.

Referring to FIG. 3C, it may be learned that, another operating system recovery method provided by this figure may also include steps S327 and S328, where content of steps S327 and S328 is respectively the same as content of steps S317 and S318, and for details, refer to descriptions in steps S317 and S318, which are not described herein again.

It may be learned that, according to the operating system recovery method provided by this embodiment of the present invention, because the location of the recovery program in the level 2 kernel in the memory is the same as the location of the recovery program in the original kernel in the memory, it may be ensured that the operating system can be smoothly recovered, by using the level 2 kernel, to the state, before the operating system enters the hibernation mode, of the operating system; in addition, because according to the technical solutions provided by this embodiment of the present invention, the operating system is recovered, by starting the level 2 kernel, to the state, before the operating system enters the hibernation mode, of the operating system and the level 2 kernel is obtained by tailoring and recompiling the original kernel, the time required for starting the level 2 kernel is less than the time required for starting the original kernel, that is, a speed of starting the level 2 kernel is accelerated. That is, by using the technical solutions in this embodiment of the present invention, the recovery speed of the operating system can be accelerated on a basis of ensuring a normal recovery of the operating system.

Further, because the image file of the level 2 kernel is smaller than the image file of the original kernel, the time required for loading the image file of the level 2 kernel is also less than the time required for loading the image file of the original kernel. Then, the recovery speed of the operating system is further accelerated.

Figure 4:
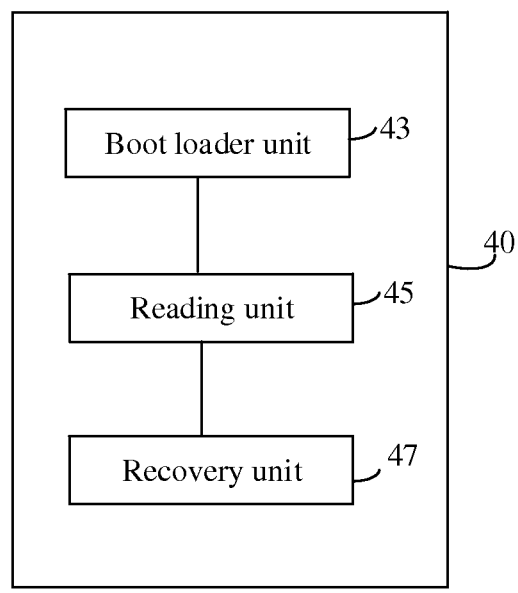
FIG. 4 is a schematic structural diagram of an operating system recovery apparatus according to an embodiment of the present invention.

Referring to FIG. 4, FIG. 4 is a schematic structural diagram of an operating system recovery apparatus 40 according to an embodiment of the present invention. The operating system recovery apparatus 40 provided by this embodiment of the present invention may also be applied to the terminal device shown in FIG. 1. As shown in FIG. 4, the apparatus 40 includes a boot loader unit 43, a reading unit 45, and a recovery unit 47.

The boot loader unit 43 is configured to start a level 2 kernel, where the level 2 kernel is obtained by tailoring an image file of the original kernel and then compiling a tailored image file of the original kernel.

It should be noted that the level 2 kernel is obtained by tailoring an image file of the original kernel and then compiling a tailored image file of the original kernel, and the original kernel refers to a kernel included in an operating system before the operating system enters a hibernation mode, and a time required for starting the level 2 kernel is less than a time required for starting the original kernel. The image file of the original kernel includes multiple code segments, and an image file of the level 2 kernel is obtained by cutting a code segment that is included in the image file of the original kernel and irrelevant to recovery of the operating system. The level 2 kernel may include only a code segment that is indispensable to the recovery of the operating system, and may further include a code segment that is irrelevant to the recovery of the operating system. In conclusion, it is only required to ensure that the number of code segments included in the image file of the level 2 kernel are relatively less than the number of code segments included in the image file of the original kernel, an invention objective of accelerating a recovery speed of the operating system may be implemented in the present invention. It is worth noting that the image file of the level 2 kernel may be generated and saved in a non-volatile memory of the system when the system hibernates or is shut down, and may also be saved in the non-volatile memory of the system in advance. When the system needs to be awakened from the hibernation mode, the level 2 kernel is loaded and run, so as to implement the invention objective of the present invention. In conclusion, a manner of generating the image file of the level 2 kernel is not restrictively stipulated in this embodiment of the present invention.

It is worth noting that the boot loader unit 43 is further configured to load the image file of the level 2 kernel, and a time required for loading the image file of the level 2 kernel is less than a time required for loading the image file of the original kernel.

The reading unit 45 is configured to transfer an image file of a to-be-recovered operating system to a specified location of a memory by using the started level 2 kernel so that a location of a recovery program in the level 2 kernel in the memory is the same as a location of a recovery program in an original kernel in the memory, and the image file of the operating system includes hibernation state information of the operating system.

It should be noted that the reading unit 45 transfers the image file of the to-be-recovered operating system to the specified location of the memory by using the level 2 kernel so that the location of the recovery program in the level 2 kernel in the memory is the same as the location of the recovery program in the original kernel in the memory, where the original kernel refers to a kernel included in the operating system before the operating system enters the hibernation mode. The level 2 kernel is used to recover the operating system to a state, before the operating system enters the hibernation mode, of the operating system. Actually, the recovery program in the level 2 kernel is used to implement the foregoing recovery function. That the location of the recovery program in the level 2 kernel in the memory is the same as the location of the recovery program in the original kernel in the memory is to ensure that the recovery program in the level 2 kernel is smoothly overwritten and replaced by the recovery program in the original kernel included in a recovered operating system, that is, to implement a secure takeover from the recovery program in the level 2 kernel to the recovery program in the original kernel and avoid that other code segments of the original kernel overwrite the recovery program in the level 2 kernel and the system crashes and cannot be recovered.

The reading unit 45 is configured to transfer the image file of the to-be-recovered operating system from a non-volatile memory to the specified location of the memory by using the started level 2 kernel so that the location of the recovery program in the level 2 kernel in the memory is the same as the location of the recovery program in the original kernel in the memory, where the image file of the operating system includes the hibernation state information of the operating system.

The level 2 kernel may directly transfer the image file of the to-be-recovered operating system from the non-volatile memory to the specified location of the memory. Certainly, a prerequisite for implementing this solution is that the level 2 kernel has a function of reading a file on the non-volatile memory into the memory.

As another embodiment of the present invention, the reading unit 45 is configured to transfer the image file of the to-be-recovered operating system from a dedicated device partition of the memory to the specified location of the memory by using the started level 2 kernel so that the location of the recovery program in the level 2 kernel in the memory is the same as the location of the recovery program in the original kernel in the memory, and the image file of the operating system includes the hibernation state information of the operating system.

Correspondingly, when the reading unit 45 implements the foregoing function, the boot loader unit 43 is further configured to read the image file of the operating system on the non-volatile memory into the dedicated device partition of the memory.

In this embodiment, the level 2 kernel reads the image file of the to-be-recovered operating system from the dedicated device partition of the memory. It should be noted that when this solution is adopted, the level 2 kernel may have the function of reading a file on the non-volatile memory into the memory; and certainly, the level 2 kernel may not have the function of reading a file on the non-volatile memory into the memory. When the level 2 kernel does not have the function of reading a file on the non-volatile memory into the memory, a boot loader program first needs to read the image file of the operating system on the non-volatile memory into the dedicated device partition of the memory, and then the level 2 kernel transfers the image file of the operating system from the dedicated device partition of the memory to the specified location of the memory.

It is worth noting that the dedicated device partition of the memory refers to a partition, which is allocated to a device for dedicated use and is not managed by the kernel, in a physical memory. Addresses of the dedicated device partition in the physical memory are consecutive, and the dedicated device partition may be a PMEM partition, or the like.

The recovery unit 47 is configured to use, through the recovery program in the started level 2 kernel, the hibernation state information of the operating system included in the image file of the operating system in the specified location of the memory to recover the operating system to a state, before the operating system enters a hibernation mode, of the operating system.

The hibernation state information of the operating system refers to hibernation state information, which is frozen and saved before the operating system enters the hibernation mode, of the operating system. The hibernation state information of the operating system includes information about all processes running on the operating system, device data for representing an operating status of an external device, and original kernel data for representing an operating status of the original kernel, and the like.

Further, the recovery unit 47 is further configured to replace the level 2 kernel with the original kernel included in the recovered operating system.

The recovery program in the level 2 kernel recovers, by using the hibernation state information included in the image file of the operating system, the operating system to the state, before the operating system enters the hibernation mode, of the operating system. When the operating system is recovered, the original kernel included in the operating system is recovered simultaneously. Based on that the location of the recovery program included in the original kernel in the memory is the same as the location of the recovery program included in the level 2 kernel in the memory, the original kernel may overwrite and replace the level 2 kernel so that the operating system is successfully recovered.

Further, the recovery unit 47 is further configured to resume, by using the original kernel included in the recovered operating system, an external device suspended when the operating system enters the hibernation mode.

When the operating system is recovered to the state, before the operating system enters the hibernation mode, of the operating system the original kernel included in the operating system resumes the external device suspended when the operating system enters the hibernation mode so that the terminal device on which the operating system runs is completely recovered to the state, before the operating system enters the hibernation mode, of the operating system where the external device may be a system hard disk, or the like.

In specific implementation, each of the foregoing units may be implemented as an independent entity and may also be implemented, by performing any combination, as one or several entities. For specific implementation of each of the foregoing units, reference may be made to the foregoing embodiment, and details are not described herein again.

It may be learned that, when the operating system recovery apparatus provided by this embodiment of the present invention recovers the operating system, because the level 2 kernel is obtained by tailoring the original kernel and then compiling a tailored original kernel, the time required for starting the level 2 kernel is less than the time required for starting the original kernel; in addition, the recovery unit transfers the image file of the to-be-recovered operating system from the dedicated device partition of the memory to the specified location of the memory by using the started level 2 kernel, where the location of the recovery program in the original kernel in the memory is the same as the location of the recovery program in the level 2 kernel in the memory, which ensures that the operating system can be smoothly recovered, by using the level 2 kernel, to the state, before the operating system enters the hibernation mode, of the operating system. That is, the operating system provided by this embodiment of the present invention may accelerate the recovery speed of the operating system under a situation of ensuring a normal recovery of the operating system.

Further, the level 2 kernel according to this embodiment of the present invention is started after the image file of the level 2 kernel is loaded, the image file of the level 2 kernel is obtained by tailoring an image file of the original kernel and then compiling a tailored image file of the original kernel, and the time required for loading the image file of the level 2 kernel and starting the level 2 kernel respectively is less than the time required for loading the image file of the original kernel and starting the original kernel, thereby further reducing a time required for recovering the operating system and improving efficiency in recovering the operating system.

Figure 5:
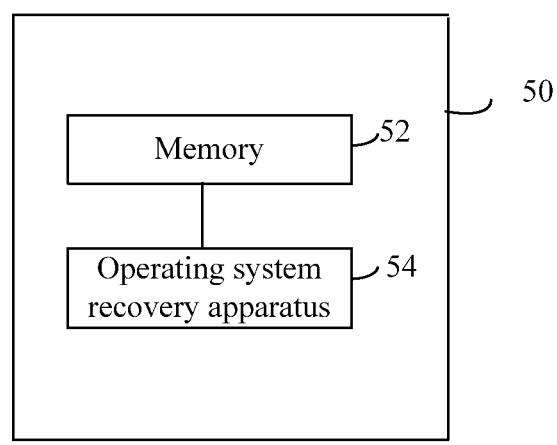
FIG. 5 is a schematic structural diagram of a terminal device according to an embodiment of the present invention.

To better implement the foregoing method and apparatus embodiments, refer to FIG. 5, and FIG. 5 is a structural block diagram of a terminal device 50 according to an embodiment of the present invention. A diagram of a logical structure of the terminal device 50 may be shown in FIG. 1. As shown in FIG. 5, the terminal device 50 includes a memory 52 and an operating system recovery apparatus 54.

The memory 52 is configured to store an image file of an operating system that runs on the terminal device.

The image file of the operating system includes hibernation state information of the operating system. The hibernation state information of the operating system refers to hibernation state information, which is frozen and saved before the operating system enters a mode, of the operating system. The hibernation state information of the operating system includes information about all processes running on the operating system, device data for representing an operating status of an external device, and original kernel data for representing an operating status of the original kernel, and the like. After a hibernation mode of the operating system is activated during running, the operating system takes a snapshot for all information included in the memory and a CPU register of the operating system, and then save the snapshot, that is, the hibernation state information of the operating system in the image file.

Certainly, the hibernation state information of the operating system may also be hibernation state information, which is set and saved in advance, of the operating system. For example, in a vehicle-mounted GPS, the hibernation state information of the operating system may be set in advance. In this way, each time the GPS starts, the GPS may be directly recovered to a fixed status to meet an actual requirement.

The operating system recovery apparatus 54 is configured to recover, by using the hibernation state information included in the image file of the operating system in a specified location of the memory, the operating system to a state, before the operating system enters the hibernation mode, of the operating system.

It should be noted that the operating system recovery apparatus 54 is configured to start a level 2 kernel, and transfer an image file of a to-be-recovered operating system to the specified location of the memory by using the started level 2 kernel so that a location of a recovery program in the level 2 kernel in the memory is the same as a location of a recovery program in an original kernel in the memory, where the level 2 kernel is obtained by tailoring an image file of the original kernel and then compiling a tailored image file of the original kernel, and the image file of the operating system includes the hibernation state information of the operating system; and the hibernation state information of the operating system included in the image file of the operating system in the specified location of the memory is used by using the recovery program in the started level 2 kernel to recover the operating system to the state, before the operating system enters the hibernation mode, of the operating system.

The level 2 kernel is started after a boot loader program loads an image file of the level 2 kernel, and the image file of the level 2 kernel is obtained by tailoring an image file of the original kernel and then compiling a tailored image file of the original kernel. The image file of the original kernel includes multiple code segments. Compared with the image file of the original kernel, the image file of the level 2 kernel is obtained by at least cutting a file management code segment of the multiple code segments included in the image file of the original kernel and recompiling the image file of the original kernel.

It is worth noting that the image file of the level 2 kernel is obtained by tailoring an image file of the original kernel and then compiling a tailored image file of the original kernel. The image file of the level 2 kernel may be generated and saved in a non-volatile memory of the system when the system hibernates or is shut down, and may also be saved in the non-volatile memory of the system in advance. When the system needs to be awakened from the hibernation mode, the level 2 kernel is loaded and run, so as to implement the invention objective of the present invention. In conclusion, a manner of generating the image file of the level 2 kernel is not restrictively stipulated in this embodiment of the present invention.

It should be noted that the level 2 kernel transfers the image file of the to-be-recovered operating system to the specified location of the memory so that the location of the recovery program in the level 2 kernel in the memory is the same as the location of the recovery program in the original kernel in the memory, where the original kernel refers to a kernel included in the operating system before the operating system enters the hibernation mode. The level 2 kernel is used to recover the operating system to the state, before the operating system enters the hibernation mode, of the operating system. Actually, the recovery program in the level 2 kernel is used to implement the foregoing recovery function. That the location of the recovery program in the level 2 kernel in the memory is the same as the location of the recovery program in the original kernel in the memory is to ensure that the recovery program in the level 2 kernel is smoothly overwritten and replaced by the recovery program in the original kernel included in the recovered operating system, that is, to implement a secure takeover from the recovery program in the level 2 kernel to the recovery program in the original kernel and avoid that other code segments of the original kernel overwrite the recovery program in the level 2 kernel and the system crashes and cannot be recovered.

As an embodiment of the present invention, the operating system recovery apparatus 54 is configured to transfer the image file of the to-be-recovered operating system from the non-volatile memory to the specified location of the memory by using the started level 2 kernel so that the location of the recovery program in the level 2 kernel in the memory is the same as the location of the recovery program in the original kernel in the memory.

The level 2 kernel may directly transfer the image file of the to-be-recovered operating system from the non-volatile memory to the specified location of the memory. Certainly, a prerequisite for implementing this solution is that the level 2 kernel has a function of reading a file on the non-volatile memory into the memory.

As another embodiment of the present invention, the operating system recovery apparatus 54 is configured to transfer the image file of the to-be-recovered operating system from a dedicated device partition of the memory to the specified location of the memory by using the started level 2 kernel so that the location of the recovery program in the level 2 kernel in the memory is the same as the location of the recovery program in the original kernel in the memory.

Before the image file of the to-be-recovered operating system is transferred from the dedicated device partition of the memory to the specified location of the memory by using the started level 2 kernel so that the location of the recovery program in the level 2 kernel in the memory is the same as the location of the recovery program in the original kernel in the memory, the operating system recovery apparatus 54 is further configured to read the image file of the operating system on the non-volatile memory into the dedicated device partition of the memory.

In this embodiment, the level 2 kernel reads the image file of the to-be-recovered operating system from the dedicated device partition of the memory. It should be noted that when this solution is adopted, the level 2 kernel may have the function of reading a file on the non-volatile memory into the memory; and certainly, the level 2 kernel may not have the function of reading a file on the non-volatile memory into the memory. When the level 2 kernel does not have the function of reading a file on the non-volatile memory into the memory, the boot loader program first needs to read the image file of the operating system on the non-volatile memory into the dedicated device partition of the memory, and then the level 2 kernel transfers the image file of the operating system from the dedicated device partition of the memory to the specified location of the memory.

It is worth noting that the dedicated device partition of the memory refers to a partition, which is allocated to a device for dedicated use and is not managed by the kernel, in a physical memory. Addresses of the dedicated device partition in the physical memory are consecutive, and the dedicated device partition may be a PMEM partition, or the like.

It should be noted that the operating system recovery apparatus 54 is further configured to replace the level 2 kernel with the original kernel included in a recovered operating system. In addition, the operating system recovery apparatus 54 is further configured to resume, by using the original kernel included in the recovered operating system, an external device suspended when the operating system enters the hibernation mode.

It may be learned that, when the terminal device according to this embodiment of the present invention is used to recover the operating system on the terminal device, because the location of the recovery program in the original kernel in the memory is the same as the location of the recovery program in the level 2 kernel in the memory, it may be ensured that the operating system can be smoothly recovered, by using the level 2 kernel, to the state, before the operating system enters the hibernation mode, of the operating system; in addition, because according to the technical solutions provided by this embodiment of the present invention, the operating system is recovered to the state, before the operating system enters the hibernation mode, of the operating system by starting the level 2 kernel, and the level 2 kernel is obtained by tailoring and recompiling the original kernel, a time required for starting the level 2 kernel is less than a time required for starting the original kernel, that is, a speed of starting the level 2 kernel is accelerated. That is, the operating system provided by this embodiment of the present invention may accelerate a recovery speed of the operating system under a situation of ensuring a normal recovery of the operating system.

Further, because the image file of the level 2 kernel is smaller than the image file of the original kernel, a time required for loading the image file of the level 2 kernel is also less than a time required for loading the image file of the original kernel. Then, the recovery speed of the operating system is further improved.

Figure 6:
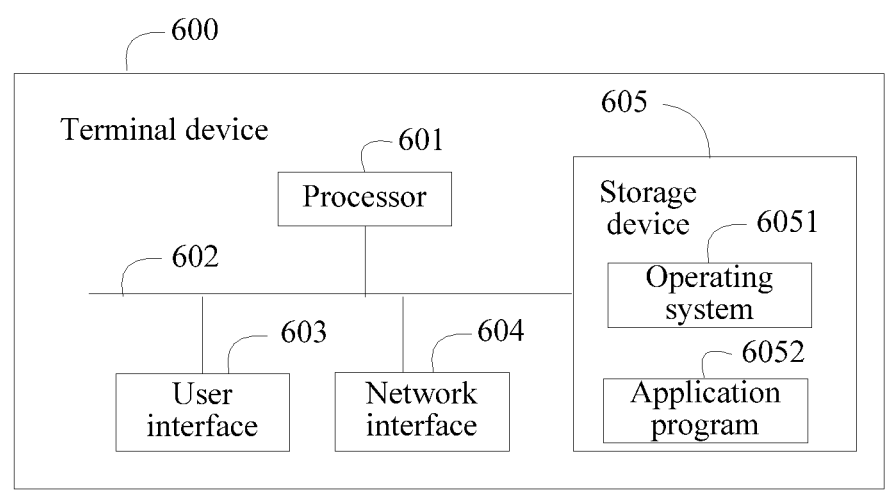
FIG. 6 is a structural block diagram of another terminal device according to an embodiment of the present invention.

To better implement the foregoing method and apparatus embodiment, refer to FIG. 6, and FIG. 6 is a structural block diagram of a terminal device 600 according to an embodiment of the present invention. A diagram of a logical structure of the terminal device 600 may be shown in FIG. 1. As shown in FIG. 6, the terminal device 600 includes at least one processor 601, at least one network interface 604 or another user interface 603, a storage device 605, and at least one communications bus 602. The communications bus 602 is configured to implement connection communication among these components. The terminal device 600 includes optionally the user interface 603 and includes a display (for example, a touch screen, a liquid crystal display (LCD), a cathode ray tube (CRT), holographic imaging, or a projector), a keyboard, or a click device (for example, a mouse, a trackball, a touchpad, or a touch screen).

The storage device 605 may include a read-only memory and a random access memory, and provides an instruction and data for the processor. A part of the storage device 605 may further include a nonvolatile random access memory (NVRAM).

In some embodiments, the storage device 605 stores the following elements, an executable module or a data structure, or a subset of the executable module or the data structure, or an extension set of the executable module or the data structure.

An operating system 6051 includes various system programs, such as a framework layer, a core library layer, and a driver layer, and is configured to implement various basic services and process a hardware-based task.

An application program module 6052 includes various application programs, such as a launcher, a media player, and a browser, and is configured to implement various application services.

In this embodiment of the present invention, by invoking a program or an instruction stored in the storage device 605, the processor 601 is configured to start a level 2 kernel, and transfer an image file of a to-be-recovered operating system to a specified location of a memory by using the started level 2 kernel so that a location of a recovery program in the level 2 kernel in the memory is the same as a location of a recovery program in an original kernel in the memory, where the level 2 kernel is obtained by tailoring an image file of the original kernel and then compiling a tailored image file of the original kernel, and the image file of the operating system includes hibernation state information of the operating system; and the hibernation state information of the operating system included in the image file of the operating system in the specified location of the memory is used through the recovery program in the started level 2 kernel to recover the operating system to a state, before the operating system enters a hibernation mode, of the operating system.

It should be noted that the image file of the level 2 kernel is obtained by tailoring a code segment that is included in the image file of the original kernel and irrelevant to recovery of the operating system. The level 2 kernel may include only a code segment that is indispensable to the recovery of the operating system, and may also include a code segment that is irrelevant to the recovery of the operating system. In conclusion, that an invention objective of accelerating a recovery speed of the operating system in the present invention may be implemented as long as it is ensured that the number of code segments included in the image file of the level 2 kernel is relatively less than the number of code segments included in the image file of the original kernel shall fall within the protection scope of the present invention. It is worth noting that the image file of the level 2 kernel is obtained by tailoring an image file of the original kernel and then compiling a tailored image file of the original kernel. The image file of the level 2 kernel may be generated and saved in a non-volatile memory of the system when the system hibernates or is shut down off, and may also be saved in the non-volatile memory of the system in advance. When the system needs to be awakened from the hibernation mode, the level 2 kernel is loaded and run, so as to implement the invention objective of the present invention. In conclusion, a manner of generating the image file of the level 2 kernel is not restrictively stipulated in this embodiment of the present invention.

It should be noted that the level 2 kernel transfers the image file of the to-be-recovered operating system to the specified location of the memory so that the location of the recovery program in the level 2 kernel in the memory is the same as the location of the recovery program in the original kernel in the memory, where the original kernel refers to a kernel included in the operating system before the operating system enters the hibernation mode. The level 2 kernel is used to recover the operating system to the state, before the operating system enters the hibernation mode, of the operating system. Actually, the recovery program in the level 2 kernel is used to implement the foregoing recovery function. That the location of the recovery program in the level 2 kernel in the memory is the same as the location of the recovery program in the original kernel in the memory is to ensure that the recovery program in the level 2 kernel is smoothly overwritten and replaced by the recovery program in the original kernel included in a recovered operating system, that is, to implement a secure takeover from the recovery program in the level 2 kernel to the recovery program in the original kernel and avoid that other code segments of the original kernel overwrite the recovery program in the level 2 kernel and the system crashes and cannot be recovered.

As an embodiment of the present invention, the processor 601 is configured to transfer the image file of the to-be-recovered operating system from the non-volatile memory to the specified location of the memory by using the started level 2 kernel so that the location of the recovery program in the level 2 kernel in the memory is the same as the location of the recovery program in the original kernel in the memory.

The level 2 kernel may directly transfer the image file of the to-be-recovered operating system from the non-volatile memory to the specified location of the memory. Certainly, a prerequisite for implementing this solution is that the level 2 kernel has a function of reading a file on the non-volatile memory into the memory.

As another embodiment of the present invention, the processor 601 is configured to transfer the image file of the to-be-recovered operating system from a dedicated device partition of the memory to the specified location of the memory by using the started level 2 kernel so that the location of the recovery program in the level 2 kernel in the memory is the same as the location of the recovery program in the original kernel in the memory. Correspondingly, when the processor 601 is configured to transfer the image file of the to-be-recovered operating system from the dedicated device partition of the memory to the specified location of the memory by using the started level 2 kernel, the processor 601 is further configured to read the image file of the operating system on the non-volatile memory into the dedicated device partition of the memory.

In this embodiment, the level 2 kernel reads the image file of the to-be-recovered operating system from the dedicated device partition of the memory. It should be noted that when this solution is adopted, the level 2 kernel may have the function of reading a file on the non-volatile memory into the memory; and certainly, the level 2 kernel may not have the function of reading a file on the non-volatile memory into the memory. When the level 2 kernel does not have the function of reading a file on the non-volatile memory into the memory, a boot loader program first needs to read the image file of the operating system on the non-volatile memory into the dedicated device partition of the memory, and then the level 2 kernel transfers the image file of the operating system from the dedicated device partition of the memory to the specified location of the memory.

It is worth noting that the dedicated device partition of the memory refers to a partition, which is allocated to a device for dedicated use and is not managed by the kernel, in a physical memory. Addresses of the dedicated device partition in the physical memory are consecutive, and the dedicated device partition may be a PMEM partition, or the like.

Further, the processor 601 is further configured to load the image file of the level 2 kernel, and a time required for loading the image file of the level 2 kernel is less than a time required for loading the image file of the original kernel.

Further, the processor 601 is further configured to replace the level 2 kernel with the original kernel included in the recovered operating system.

The recovery program in the level 2 kernel recovers, by using the hibernation state information included in the image file of the operating system, the operating system to the state, before the operating system enters the hibernation mode, of the operating system. When the operating system is recovered, the original kernel included in the operating system is recovered simultaneously. Based on that the location of the recovery program included in the original kernel in the memory is the same as the location of the recovery program included in the level 2 kernel in the memory, the original kernel may overwrite and replace the level 2 kernel so that the operating system is successfully recovered.

Further, the processor 601 is further configured to resume, by using the original kernel included in the recovered operating system, an external device suspended when the operating system enters the hibernation mode.

When the operating system is recovered to the state, before the operating system enters the hibernation mode, of the operating system the original kernel included in the operating system resumes the external device suspended when the operating system enters the hibernation mode so that the terminal device on which the operating system runs is completely recovered to the state, before the operating system enters the hibernation mode, of the operating system where the external device may be a system hard disk, or the like.

It may be learned that, when the terminal device according to this embodiment of the present invention is used to recover the operating system on the terminal device, first, because the location of the recovery program in the original kernel in the memory is the same as the location of the recovery program in the level 2 kernel in the memory, it may be ensured that the operating system can be smoothly recovered, by using the level 2 kernel, to the state, before the operating system enters the hibernation mode, of the operating system; and because according to the technical solutions provided by this embodiment of the present invention, the operating system is recovered to the state, before the operating system enters the hibernation mode, of the operating system by starting the level 2 kernel, and the level 2 kernel is obtained by tailoring and recompiling the original kernel, a time required for starting the level 2 kernel is less than a time required for starting the original kernel, that is, a speed of starting the level 2 kernel is accelerated. By using the terminal device of this embodiment of the present invention, it may be ensured that efficiency in recovering the operating system is improved under a situation of ensuring a normal recovery of the operating system.

Further, because the image file of the level 2 kernel is smaller than the image file of the original kernel, the time required for loading the image file of the level 2 kernel is also less than the time required for loading the image file of the original kernel, thereby further reducing time required for recovering the operating system and improving efficiency in recovering the operating system.

Mutual reference may be made among the foregoing embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided by the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An operating system recovery method, comprising:
    starting a level 2 kernel;
    reading an image file of an operating system on a non-volatile memory into a dedicated device partition of a memory;
    transferring the image file of a to-be-recovered operating system to a specified location of the memory by using the started level 2 kernel such that a location of a recovery program in the level 2 kernel in the memory is a same as a location of a recovery program in an original kernel in the memory, wherein the level 2 kernel is obtained by tailoring the image file of the original kernel and then compiling a tailored image file of the original kernel, and wherein the image file of the operating system comprises hibernation state information of the operating system; and
    using, through the recovery program in the started level 2 kernel, the hibernation state information of the operating system comprised in the image file of the operating system in the specified location of the memory to recover the operating system to a state of the operating system before the operating system enters a hibernation mode.

2. The operating system recovery method according to claim 1, wherein transferring the image file of the to-be-recovered operating system to the specified location of the memory by using the started level 2 kernel such that the location of the recovery program in the level 2 kernel in the memory is the same as the location of the recovery program in the original kernel in the memory comprises
    transferring the image file of the to-be-recovered operating system from the non-volatile memory to the specified location of the memory by using the started level 2 kernel such that the location of the recovery program in the level 2 kernel in the memory is the same as the location of the recovery program in the original kernel in the memory.

3. The operating system recovery method according to claim 1, wherein transferring the image file of the to-be-recovered operating system to the specified location of the memory by using the started level 2 kernel such that the location of the recovery program in the level 2 kernel in the memory is the same as the location of the recovery program in the original kernel in the memory comprises:
    transferring the image file of the to-be-recovered operating system from the dedicated device partition of the memory to the specified location of the memory by using the started level 2 kernel such that the location of the recovery program in the level 2 kernel in the memory is the same as the location of the recovery program in the original kernel in the memory.

4. The operating system recovery method according to claim 1, wherein after starting the level 2 kernel and before transferring the image file of the to-be-recovered operating system to the specified location of the memory by using the started level 2 kernel, the method further comprises loading the image file of the level 2 kernel.

5. The operating system recovery method according to claim 1, wherein after using, through the recovery program in the started level 2 kernel, the hibernation state information of the operating system comprised in the image file of the operating system in the specified location of the memory to recover the operating system to the state of the operating system before the operating system enters a hibernation mode, the method further comprises replacing the level 2 kernel with the original kernel comprised in a recovered operating system.

6. The operating system recovery method according to claim 5, further comprising resuming, by using the original kernel comprised in the recovered operating system, an external device suspended when the operating system enters the hibernation mode.

7. The operating system recovery method according to claim 1, wherein the hibernation state information of the operating system comprises hibernation state information of the operating system that is frozen and saved before the operating system enters the hibernation mode, or wherein the hibernation state information of the operating system is set and saved in advance.

8. An operating system recovery apparatus, comprising:
    a boot loader unit configured to start a level 2 kernel, wherein the level 2 kernel is obtained by tailoring an image file of an original kernel and then compiling a tailored image file of the original kernel;
    a reading unit configured to read the image file of an operating system on external storage into a dedicated device partition of a memory, transfer the image file of a to-be-recovered operating system to a specified location of the memory by using the started level 2 kernel such that a location of a recovery program in the level 2 kernel in the memory is a same as a location of a recovery program in the original kernel in the memory, wherein the image file of the operating system comprises hibernation state information of the operating system; and
    a recovery unit configured to use, through the recovery program in the started level 2 kernel, the hibernation state information of the operating system comprised in the image file of the operating system in the specified location of the memory, to recover the operating system to a state of the operating system before the operating system enters a hibernation mode.

9. The operating system recovery apparatus according to claim 8, wherein the reading unit is configured to transfer the image file of the to-be-recovered operating system from a non-volatile memory to the specified location of the memory by using the started level 2 kernel such that the location of the recovery program in the level 2 kernel in the memory is the same as the location of the recovery program in the original kernel in the memory, wherein the image file of the operating system comprises the hibernation state information of the operating system.

10. The operating system recovery apparatus according to claim 8, wherein the reading unit is configured to transfer the image file of the to-be-recovered operating system from the dedicated device partition of the memory to the specified location of the memory by using the started level 2 kernel such that the location of the recovery program in the level 2 kernel in the memory is the same as the location of the recovery program in the original kernel in the memory, wherein the image file of the operating system comprises the hibernation state information of the operating system.

11. The operating system recovery apparatus according to claim 8, wherein the boot loader unit is further configured to load the image file of the level 2 kernel.

12. The operating system recovery apparatus according to claim 8, wherein the recovery unit is further configured to replace the level 2 kernel with the original kernel comprised in the recovered operating system.

13. The operating system recovery apparatus according to claim 12, wherein the recovery unit is further configured to resume, by using the original kernel comprised in the recovered operating system, an external device suspended when the operating system enters the hibernation mode.

14. A terminal device, comprising:
a memory configured to store an image file of an operating system that runs on the terminal device;
a processor coupled with the memory and configured to:
start a level 2 kernel;
read an image file of the operating system on a nonvolatile memory into a dedicated device partition of the memory;
transfer the image file of a to-be-recovered operating system from the dedicated device partition of the memory to a specified location of a memory by using the started level 2 kernel such that a location of a recovery program in the level 2 kernel in the memory is a same as a location of a recovery program in an original kernel in the memory, wherein the level 2 kernel is obtained by tailoring the image file of the original kernel and then compiling a tailored image file of the original kernel, and wherein the image file of the operating system comprises hibernation state information of the operating system; and
use, through the recovery program in the started level 2 kernel, the hibernation state information of the operating system comprised in the image file of the operating system in the specified location of the memory to recover the operating system to a state of the operating system before the operating system enters a hibernation mode.

15. The terminal device according to claim 14, wherein after starting the level 2 kernel and before transferring the image file of the to-be-recovered operating system to the specified location of the memory by using the started level 2 kernel, the processor is further configured to load the image file of the level 2 kernel.

16. The terminal device according to claim 14, wherein after using, through the recovery program in the started level 2 kernel, the hibernation state information of the operating system comprised in the image file of the operating system in the specified location of the memory to recover the operating system to the state of the operating system before the operating system enters a hibernation mode, the processor is further configured to replace the level 2 kernel with the original kernel comprised in a recovered operating system.

17. The terminal device according to claim 16, wherein the processor is further configured to resume, by using the original kernel comprised in the recovered operating system, an external device suspended when the operating system enters the hibernation mode.

18. The terminal device according to claim 14, wherein the hibernation state information of the operating system comprises hibernation state information of the operating system that is frozen and saved before the operating system enters the hibernation mode, or wherein the hibernation state information of the operating system is set and saved in advance.

* * * * *